Nov. 24, 1942.　　　L. C. HUCK　　　2,302,772
RIVET AND RIVETED STRUCTURE
Filed Aug. 12, 1940

INVENTOR
Louis C. Huck.
BY
Harness, Dickey & Pierce
ATTORNEYS.

Patented Nov. 24, 1942

2,302,772

UNITED STATES PATENT OFFICE 2,302,772

RIVET AND RIVETED STRUCTURE

Louis C. Huck, Grosse Pointe, Mich., assignor to Huck Manufacturing Company, Detroit, Mich., a corporation of Michigan Application August 12, 1940, Serial No. 352,205

7 Claims. (Cl. 78—54)

The invention relates generally to riveting and it has particular relation to the riveting of aeroplane structures or the like where flush riveting and streamlining are important factors.

The employment of so-called flush type rivets in the riveting of metal covers or sheeting on aeroplanes is not generally new. In practicing this type of riveting, laminated metal sheets are formed with dimples around a rivet opening and a rivet having a frusto conical head is applied so that such head, in a general way, seats in the dimple recess approximately flush with the sheet surface. Methods of dimpling metal sheets for the purpose of applying rivets of this general type are discussed in my copending application for patent, Serial No. 327,138, filed April 1, 1940, and in an application for patent filed herewith and relating to metal plate dimpling machines.

One object of the present invention is to provide an improved form of rivet adapted for application to dimpled openings in metal plates, which is of such character that the head on the rivet so merges into the sheet metal surface around the dimpled opening that a substantially smooth and uninterrupted metal surface is obtained.

Another object of the invention is to provide an improved form of rivet for the purposes mentioned above, wherein the head of the rivet is to have a fairing of such character that it substantially covers the annular gap or recess between the conical head portion of the rivet and the surface of the metal around the dimple.

Other objects of the invention will become apparent from the following specification, from the drawing relating thereto, and from the claims hereinafter set forth.

For a better understanding of the invention, reference may be had to the drawing. wherein.

Figure 2:
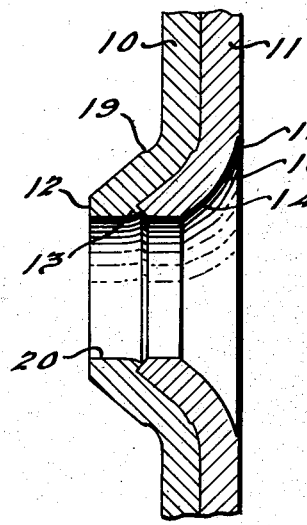
Fig. 2 is a cross-sectional view illustrating laminated metal sheets provided with a dimpled opening adapted particularly to receive the rivet shown by Fig. 1.

Referring to Fig. 2 in particular, a pair of metal sheets 10 and 11 disposed in laminated relation are shown, and these sheets may constitute part of the skin or cover of an aeroplane or the like. Prior to forming the dimpled recess in the sheet, a rivet opening is formed through the sheets and then the dimpling operation is effected by means of mechanism such as disclosed in my copending application for patent filed herewith, Serial No. 352,204, filed August 12, 1940, entitled Metal plate dimpling machine. In this dimpling operation, the corner edge of the sheet 10 is flattened as indicated at 12, the metal extrudes to a certain extent as indicated at 13, and the plate 11 has a dimple recess including a conical portion 14. Outwardly of the conical portion 14, the metal is curved or bent as indicated at 16 owing to the bending caused by the dimpling and the outer part of the curved portion may be coined to provide a shallow recess 17 having a slightly conical bottom which makes an angle of 10°, for example, with the sheet metal surface outwardly of the dimple. It may be noted also that the metal may extrude or shift slightly as indicated at 19 as a result of the dimpling operation. After the dimpling operation the hole through the sheets may be enlarged slightly by means of a drill in order to provide a more fully cylindrical and smooth opening as indicated at 20, and mention of this is made in my copending application for patent, Serial No. 327,138.

Figure 1:
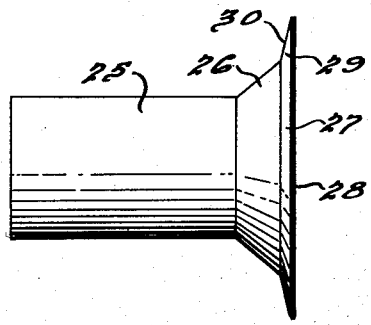
Figure 1 is a side view of an unset rivet constructed according to one form of the invention.

Now referring to Fig. 1, the rivet shown comprises a cylindrical body 25, having a frusto-conical head portion 26 at one end which joins a thin or narrow disclike section 27 on the larger end of the portion 26. This disclike section 27 has a smooth flat, outer surface 28 and is substantially larger in diameter than the larger end of the portion 26 so that a substantial flange or fairing 29 extends outwardly and radially. The underside or face of the flange 29, as indicated at 30, forms a wire less than 180° obtuse angle with the conical surface of portion 26 and forms a small, acute angle with the outer face 28 of the section 27. As an instance of angularity, the face 30 may form an angle with the face 28 of 9½° while the cone angle of the frusto conical portion 26 may be in the neighborhood of 78°, although it should be understood that these angularities may vary. It is of importance to note, however, that the section 27 is thin and that the flange 29 has its upper and lower sides converging outwardly substantially to a sharp edge having a thickness for instance of .002 of an inch.

Figure 3:
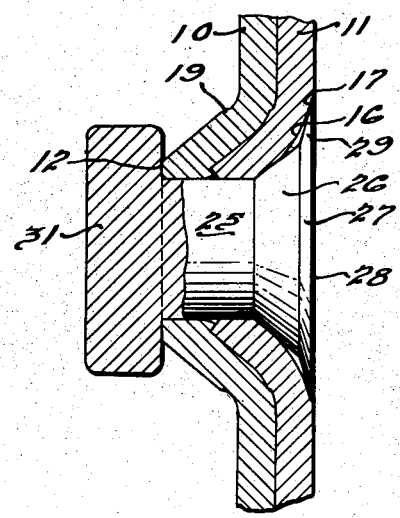
Fig. 3 is a cross-sectional view illustrating the riveted structure after the rivet has been set.
Figure 4:
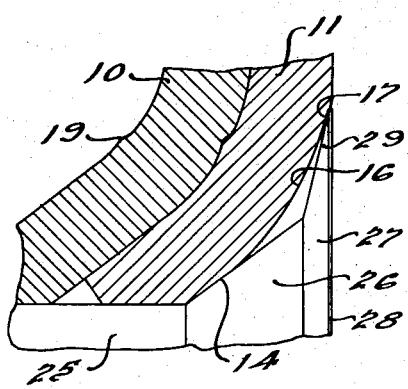
Fig. 4 is an enlarged detail view of a riveted structure on the order of Fig. 3, wherein the edge of the fairing is disposed in a coined recess.
Figure 5:
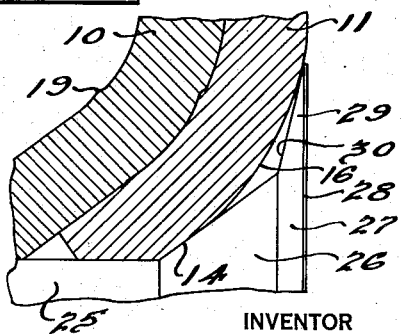
Fig. 5 is a view similar to Fig. 4 with the coined recess omitted.

Now referring in particular in Figs. 3, 4, and 5, showing the rivet applied, it is to be observed that the outer thin edge of the fairing 29 contacts the metal surface and that inwardly towards the rivet axis, the sheet metal surface and face 30 of the fairing diverge. Where the coined recess 17 is present, as in Fig. 4, this outer edge contact of the fairing and recess occurs since the angle the bottom of the recess makes with the sheet metal surface beyond the dimple is greater than that angle formed by the face 30 with the metal surface beyond the dimple or with the surface 28. While it is desired to have this outer edge contact to eliminate any interstice under the edge of the fairing, it will be realized that the portions 26 and 14 must contact and that tolerances and variations possibly may result in the edge of the fairing being very slightly out of contact. Normally it is desired and intended that full contact will occur at 14 and that the outer edge of the fairing will contact the sheet metal surface.

With particular reference to Fig. 5, it may be stated that the surface 30 of the fairing also diverges inwardly toward the rivet axis with respect to the curving surface 16 so as to obtain outer edge contact of the fairing with the curved sheet metal surface. In certain cases the surface 30 will be substantially tangential to the curved surface at the line of contact, but this relation may vary with different curvatures in the sheet metal in turn depending upon the thickness of the sheets 10 and 11 and other factors.

In either case, the angularity of the face 30 of the fairing is selected so that outer edge contact of the fairing with the sheet metal surface will occur although contact of the entire surface 30 or a part of it with the sheet metal surface is not undesirable providing the outer edge contact is also obtained. By having an inwardly diverging relation between the surface 30 of the fairing and the sheet metal surface thereunder, the preferred outer edge contact may be obtained even though the curvature 16 changes to some extent, as in the case where the sheets vary in thickness. Hence, the angularity of the fairing makes it adaptable for dimples in sheet metal varying considerably in thickness while still obtaining the desired outer edge contact.

As illustrated in Figs. 4 and 5, the sheet metal surface may still curve very slightly somewhat beyond the outer edge of the fairing, before it becomes truly flat or of otherwise normal contour, and this slight outward curving places the outer surface of the rivet in a practically true, flush relation with the normal contour of the metal surface outwardly of the dimpled area. By having the outer edge of the fairing as sharp as specified and in contact with the metal surface at such edge, the rivet head surface 28 merges into the sheet metal surface with minimum interruption or gap space, while still having an edge thickness which will not be too weak or too deformable for practical use. It should be understood that this result is obtained satisfactorily without the coined recess 17 owing to the extremely thin edge on the fairing and the angularity of the face 30.

In setting the rivet, a mechanism may be employed which applies opposing forces to opposite ends of the rivet to cause the end of the body 25 opposite the head to be upset to form a head 31 which locks the two dimpled parts of the sheets in closely nested relation.

For airplane work, the sheets 10 and 11 ordinarily will be constructed of an aluminum alloy and the rivets will likewise be constructed of an aluminum alloy in order to obtain strength and malleability with lightness.

Although only one form of the invention has been illustrated and described in detail, it will be apparent to those skilled in the art that various modifications may be made without departing from the scope of the appended claims.

What is claimed is:

1. A riveted structure comprising upper and lower metal sheets having a rivet opening therethrough with the metal dimpled around the opening to form a substantially conical recess in the upper sheet with the larger end of the recess merging into an outwardly flaring surface, a rivet in said opening, a head on the end of the rivet at the lower side of the lower sheet, a substantially frusto-conical head on the upper end of the rivet and fitting the substantially conical recess, and an annular fairing projecting radially from the upper end of the frusto-conical head and disposed in overlapping relation to the outwardly flaring surface of the recess and substantially contacting the upper sheet adjacent the outer edge of the fairing, with inner portions of the fairing substantially out of contact with said flaring surface.

2. A riveted structure comprising upper and lower metal sheets having a rivet opening therethrough with the metal dimpled around the opening to form a substantially conical recess in the upper sheet with the larger end of the recess merging into an outwardly flaring rounded surface, a rivet in said opening, a head on the end of the rivet at the lower side of the lower sheet, a substantially frusto-conical head on the upper end of the rivet and fitting the substantially conical recess, and an annular fairing projecting radially from the upper end of the frusto-conical head in overlapping relation to said rounded surface, the fairing having its upper and lower surfaces converging outwardly to a substantially thin edge substantially contacting the upper sheet with the lower surface of the fairing directed at a less than 180° obtuse angle to the frusto-conical head and with inner portions of such lower surface substantially out of contact with the flaring surface.

3. An article of manufacture for use in dimple riveting metal sheets wherein the dimple recess is defined by a frusto-conical surface with the larger end of the recess merging into an outwardly flaring rounded surface comprising an unset rivet element having a body portion adapted to project through the dimple opening, a frusto-conical head portion on one end of and co-axial to the body portion with the smaller end of the frusto-conical portion next to the body portion, and a thin, axially narrow end portion at the larger end of the frusto-conical end and extending radially outwardly beyond said end to provide a thin fairing flange, said end portion having its entire outer end face substantially flat and substantially radial to the rivet axis, the under side of the fairing being directed in radially outwardly converging relation to the end face at an acute angle thereto and being directed inwardly in converging relation to the frusto-conical head portion so as generally to define a less than 180° obtuse angle thereto.

4. An article of manufacture for use in dimple riveting metal sheets wherein the dimple recess is defined by a frusto-conical surface with the larger end of the recess merging into an outwardly flaring rounded surface comprising an unset rivet element having a body portion adapted to project through the dimple opening, a frusto-conical head portion on one end of and co-axial to the body portion with the smaller end of the frusto-conical portion next to the body portion, and a thin, axially narrow end portion at the larger end of the frusto-conical end and extending radially outwardly beyond said end to provide a thin fairing flange, said end portion having its entire outer end face substantially flat and substantially radial to the rivet axis, the under side of the fairing being directed in radially outwardly converging relation to the end face at an acute angle thereto and being directed inwardly in converging relation to the frusto-conical head portion so as generally to define a less than 180° obtuse angle thereto, said end face and under side of the fairing terminating outwardly in a thin, substantially sharp edge.

5. An article of manufacture for use in dimple riveting of metal sheets comprising an unset rivet element having a body portion adapted to project through the openings in the sheets, a substantially frusto-conical head portion on one end of and coaxial to the rivet axis with the smaller end of the frusto-conical portion next to the body portion, and an axially narrow or thin end portion at the larger end of the frusto-conical head portion and of substantially larger diameter so as to form a thin, annular fairing flange projecting outwardly from the larger end of the head portion, the under surface of the flange next to the frusto-conical head portion defining a second substantially frusto-conical surface at the larger end of the frusto-conical head portion and directed at a less than 180° obtuse angle thereto, the opposite surface of the narrow end portion defining a substantially radial end face which outwardly converges at an acute angle relative to the second frusto-conical surface to form a substantially sharp outer edge on the fairing.

6. An article of manufacture for use in dimple riveting of metal sheets comprising an unset rivet element having a body portion adapted to project through the openings in the sheets, a substantially frusto-conical head portion on one end of and co-axial to the rivet axis with the smaller end of the frusto-conical portion next to the rivet body, and an axially narrow or thin end portion at the larger end of the frusto-conical head portion and of substantially larger diameter so as to form a thin, annular fairing flange projecting outwardly from the larger end of the frusto-conical head portion, the under side of the fairing being flared radially outwardly from the larger end of the head portion in diverging relation thereto and in converging relation to the opposite or end face of the fairing, and said end face being substantially radial and substantially flat and converging outwardly relative to the under side of the fairing to form a substantially sharp edge.

7. The method of dimple riveting a pair of sheets which comprises forming a dimple opening wherein the opening has a frusto-conical portion and an outwardly flaring surface extending from the larger end of the frusto-conical portion to the outer margin of the dimple, applying a rivet which has a frusto-conical end portion seated in the frusto-conical portion of the recess and an outer end face substantially flush with the sheet surface around the dimple and an annular fairing substantially contacting the flaring sheet surface at the outer margin of the latter with inner portions of the under surface of the fairing substantially out of contact with the flaring sheet surface so as to provide a space, and then setting the rivet by axially compressive forces applied against opposite ends thereof.

LOUIS C. HUCK.